(12) United States Patent
Aizenberg et al.

(10) Patent No.: US 7,459,197 B2
(45) Date of Patent: Dec. 2, 2008

(54) REVERSIBLY ADAPTIVE ROUGH MICRO- AND NANO-STRUCTURES

(75) Inventors: Joanna Aizenberg, New Providence, NJ (US); Shu Yang, Philadelphia, PA (US)

(73) Assignees: Lucent Technologies Inc., Murray Hill, NJ (US); The Trustees of the University of Pennsylvania, Philadelphia, PA (US)

( * ) Notice: Subject to any disclaimer, the term of this patent is extended or adjusted under 35 U.S.C. 154(b) by 350 days.

(21) Appl. No.: 10/999,249

(22) Filed: Nov. 30, 2004

(65) Prior Publication Data

US 2006/0115623 A1 Jun. 1, 2006

(51) Int. Cl.
B32B 3/30 (2006.01)
(52) U.S. Cl. .................... 428/141; 428/195.1; 427/256; 427/259; 427/258; 427/264
(58) Field of Classification Search .................. 428/141, 428/195.1; 427/256, 259, 258, 264
See application file for complete search history.

(56) References Cited

U.S. PATENT DOCUMENTS 7,150,904 B2 * 12/2006 D'Urso et al. .............. 428/116
2004/0163758 A1 * 8/2004 Kagan et al. ................ 156/230

OTHER PUBLICATIONS

Barthlott, W., et al, "Purity of the Sacred Lotus, or escape from contamination in biological surfaces", Planta. vol. 202, pp. 1-8 (1997).

Cassie, A.B.D., et al., "Wettability of Porous Surfaces", Trans. Farad. Soc., vol. 40, pp. 546-551 (1944).
Desai, S.M., et al, "Controlled Grafting of N-isopropyl acrylamide brushes onto self-standing isotactic polypropylene thin films: surface initiated atom transfer radical polymerization", Polymer, vol. 44, pp. 7645-7649 (2003).
Dubois, L.H., et al., "Fundamental Studies of Microscopic Wetting on Organic Surfaces. 2. Interaction of Secondary Adsorbates With Chemically Textured Organic Monolayers", J.Am.Chem.Soc., vol. 112, pp. 570-579 (1990).
Ejaz, M., et al, "Controlled Grafting of a Well-Defined Glycopolymer on a Solid Surface by Surface-Initiated Atom Transfer Radical Polymerization", Macromolecules, vol. 33, pp. 2870-2874 (2000).
Erbil, H.Y., et al, "Transformation of a Simple Plastic into a Superhydrophobic Surface", Science, vol. 299, pp. 1377-1380 (2003).
Ito, Y., et al., "Patterned Immobilization of Thermoresponsive Polymer", Langmuir, vol. 13, pp. 2756-2759 (1997).
Ito, Y., et al, "Signal-responsive Gating of Porous Membranes by Polymer Brushes", Polym. Adv. Technol., vol. 11, pp. 136-144 (2000).

(Continued)

*Primary Examiner*—William P Watkins, III (57) ABSTRACT

Reversibly adaptive rough structures, comprising: a substrate; a plurality of raised elements on the substrate, the raised elements mutually spaced apart by channel regions on the substrate, each of the raised elements having a lateral surface and a distal end; the lateral surface, the distal end and the channel regions having hydrophobic molecules thereon; and the distal end having reversibly adaptive bristles thereon, the reversibly adaptive bristles being convertible between relatively hydrophilic and hydrophobic states by the application of an external stimulus. Techniques for making reversibly adaptive rough structures.

20 Claims, 4 Drawing Sheets

OTHER PUBLICATIONS

Jeyaprakash, J.D., et al., "Polymer Brushes Via ATRP: Role of Activator and Deactivator in the Surface-Initiated ATRP of Styrene on Planar Substrates", Macromol. Rapid Commun., vol. 23, pp. 277-281 (2002).

Kim, Joonwon et al., "Nanostructured Surfaces for Dramatic Reduction of Flow Resistance in Droplet-Based Microfluidics", Technical Digest, Fifteenth IEEE International Conference on Micro Electro Mechanical Systems, pp. 479-482 (Feb. 2002).

Kinoshita, Takatoshi, "New Trends in Photobiology: Photoresponsive Membrane Systems", J. Photochem. And Photobio. B: Bio., vol. 42, pp. 12-19 (1998).

Krupenkin, T.N., et al, "From Rolling Ball to Complete Wetting: The Dynamic Tuning of Liquids on Nanostructured Surfaces", Langmuir, vol. 20, pp. 3824-3827 (2004).

Laibinis, P.E., et al, "Comparison of the Structures and Wetting Properties of Self-Assembled Monolayers of n-Alkanethiols on the Coinage Metal Surfaces, Cu, Ag, Au", J.Am.Chem.Soc., vol. 113, pp. 7152-7167 (1991).

Lemieux, M., et al, "Reorganization of Binary Polymer Brushes: Reversible Switching of Surface Microstructures and Nanomechanical Properties", Macromolecules, vol. 36, pp. 7244-7255 (2003).

Liu, H., et al., "Cell Attachment and Detachment on Micropattern-Immobilized Poly(N-Isopropyl Acrylamide) with Gelatin", Lab Chip, pp. 175-178 (2002).

Luo, N., et al., "Surface Grafting of Polyacrylamide from Polyethylene-Based Copolymer Film", J. Appl. Poly. Sci., vol. 92, pp. 1589-1595 (2004).

Minko, S., et al., "Two-Level Structured Self-Adaptive Surfaces with Reversibly Tunable Properties", J.Am.Chem.Soc., vol. 125, pp. 3896-3900 (2003).

Nuzzo, R.G., et al, "Fundamental Studies of Microscopic Wetting on Organic Surfaces. I. Formation and Structural Characterization of a Self-Consistent Series of Polyfunctional Organic Monolayers", J.Am.Chem.Soc., vol. 112, pp. 558-569 (1990).

Okano, T., et al., "Temperature-Responsive Poly(N-isopropyl Acrylamide ) as a Modulator for Alteration of Hydrophilic—Hydrophobic Surface Properties to Control Activation / Inactivation of Platelets", Journal of Controlled Release, vol. 36, pp. 125-133 (1995).

Park, Y.S., et al, "Permeation Control Through Porous Membranes Immobilized with Thermosensitive Polymer", Langmuir, vol. 14, pp. 910-914 (1998).

Paul, R., et al., "Photoinitiated Polymerization of Styrene from Self-Assembled Monolayers on Gold. II. Grafting Rates and Extraction", J. Polym. Sci., Part A: Polymer Chem., vol. 40, pp. 3284-3291 (2002).

Pelton, R., "Temperature-Sensitive Aqueous Microgels", Advances in Colloid & Interface Science, vol. 85. pp. 1-33 (2000).

Sellers, Harrell, et al, "Structure and Binding of Alkanethiolates on Gold and Silver Surfaces: Implications for Self-Assembled Monolayers", J.Am.Chem.Soc., vol. 115, pp. 9389-9401 (1993).

Shiu, J.Y., et al, "Fabrication of Tunable Superhydrophobic Surfaces by Nanosphere Lithography", Chem. Mater., vol. 16, No. 4, pp. 561-564 (2004).

Sun, T., et al., "Reversible Switching Between Superhydrophilicity and Superhydrophobicity", Angew. Chem. Int. Ed., vol. 43, pp. 357-360 (2004).

Wenzel, R.N., "Resistance of Solid Surfaces to Wetting by Water" Ind. Eng. Chem., vol. 28, pp. 988-994 (1936).

Xia. Younan, et al, "Soft Lithography", Annu.Rev.Mater.Sci., vol. 28, pp. 153-184 (1998).

Zhao, B., et al., "Polymer Brushes: Surface Immobilized Macromolecules". Prog. Poly. Sci., vol. 25. pp. 677-710 (2000).

* cited by examiner

REVERSIBLY ADAPTIVE ROUGH MICRO- AND NANO-STRUCTURES

FIELD OF THE INVENTION

The present invention relates to the field of surfaces comprising raised elements mutually spaced apart by channel regions on a substrate.

BACKGROUND OF THE INVENTION

Much work has been done to explore hydrophobicity and hydrophilicity in surfaces. Hydrophobic surfaces repel aqueous liquids, and hydrophilic surfaces attract aqueous liquids. A high degree of surface roughness generally results in a substantial increase in the hydrophobicity of a solid substrate, which accordingly exhibits extremely high water repellency and very low aqueous flow resistance. Such behavior makes superhydrophobic surfaces very attractive for a wide range of applications ranging from microfluidics and lab-on-a-chip devices, to drag reduction coatings and self-cleaning coatings. There also has been increasing research interest directed to enabling reversible tuning of surface wettability in order to dynamically switch the surface properties, including droplet mobility, contact angle, and the effective area of the solid-liquid interface, all from the same substrate. Such a level of dynamic control would potentially allow fabrication of smart surfaces capable of manipulating liquids at the micro- and macro-scales.

For example, surfaces have been prepared having an initially hydrophobic state, which can be induced by an external stimulus to become hydrophilic. Hence, an aqueous liquid in contact with the surface in its initial form cannot wet the surface, but can wet the surface after conversion to the hydrophilic state. However, once such surfaces are wet by an aqueous liquid, removal of the liquid and restoration of the surface to a hydrophobic state typically is quite difficult if not virtually impossible. Hence, such surfaces often can only be activated once to switch from the hydrophobic to a hydrophilic state. Even for such one time switching, these surfaces can be useful. For example, movement of an aqueous liquid over such a surface is impeded by a hydrophobic state, and facilitated by a hydrophilic state. However, the one way and one use limitations posed by such surfaces is a restraint on their utility.

In one prior approach to achieve reversibility of a hydrophilic surface to a hydrophobic state, solvents were selectively applied to the surface to change the character of hydrophilic and hydrophobic fibers both bonded to the surface. See, for example, Minko, S. et al., "Two-Level Structured Self-Adaptive Surfaces with Reversibly Tunable Properties", *J. Am. Chem. Soc.*, Vol. 125, pp. 3896-3900 (2003). However, conversions of the surface between hydrophilic and hydrophobic states in this system were slow, messy, and generally allowed no spatial control of the state changes across the surface.

There is accordingly a continuing need for surfaces that are reversible between hydrophobic and hydrophilic states.

SUMMARY OF THE INVENTION

In one embodiment, a reversibly adaptive rough structure is provided, comprising a substrate and a plurality of raised elements on the substrate. The raised elements are mutually spaced apart by channel regions on the substrate. Each of the raised elements has a lateral surface and a distal end. The lateral surface, the distal end and the channel regions have hydrophobic molecules thereon. The distal end has reversibly adaptive bristles thereon. The reversibly adaptive bristles are convertible between relatively hydrophilic and hydrophobic states by the application of an external stimulus.

In another embodiment, a process for making a reversibly adaptive rough structure is provided, comprising the steps of providing a substrate, and providing a plurality of raised elements on the substrate. The raised elements are mutually spaced apart by channel regions on the substrate. Each of the raised elements has a lateral surface and a distal end. An adhesion layer is provided on the raised elements and channel regions. The adhesion layer comprises a thiol-binding surface. Hydrophobic molecules comprising thiol moieties are bound onto the adhesion layer. Reversibly adaptive bristles comprising thiol moieties are bound onto the distal ends. The reversibly adaptive bristles are convertible between relatively hydrophilic and hydrophobic states by the application of an external stimulus.

In a further embodiment, a process is provided for making a reversibly adaptive rough structure, comprising the steps of providing a substrate, and providing a plurality of raised elements on the substrate. The raised elements are mutually spaced apart by channel regions on the substrate. Each of the raised elements has a lateral surface and a distal end. Hydrophobic molecules are bound onto the lateral surfaces, the distal ends and the channel regions. Reversibly adaptive bristles are bound onto the distal ends. The reversibly adaptive bristles are convertible between relatively hydrophilic and hydrophobic states by the application of an external stimulus.

In an additional embodiment, a process is provided for making a reversibly adaptive rough structure, comprising the steps of providing a substrate, and providing a plurality of raised elements on the substrate. The raised elements are mutually spaced apart by channel regions defining channels on the substrate. Each of the raised elements has a lateral surface and a distal end. The channels are filled with sacrificial material. Reversibly adaptive bristles are bound onto the distal ends. The reversibly adaptive bristles are convertible between relatively hydrophilic and hydrophobic states by the application of an external stimulus. The sacrificial material is removed. Hydrophobic molecules are bound onto the lateral surfaces, the distal ends and the channel regions.

A more complete understanding of the present invention, as well as other features and advantages of the invention, will be apparent from the following detailed description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

The present invention provides reversibly adaptive rough structures and methods for making the same. These rough structures comprise raised elements spaced apart by interposed channels on a substrate. The raised elements comprise bristles and a desired portion of the bristles are reversibly adaptive. By "adaptive" is meant that the bristles can be affected by external stimuli to become either relatively hydrophobic or relatively hydrophilic. By "reversibly" is meant that these relatively hydrophobic and hydrophilic states can be controlled, and that the bristles can be successively switched between such relatively hydrophobic and hydrophilic states.

Figure 1:
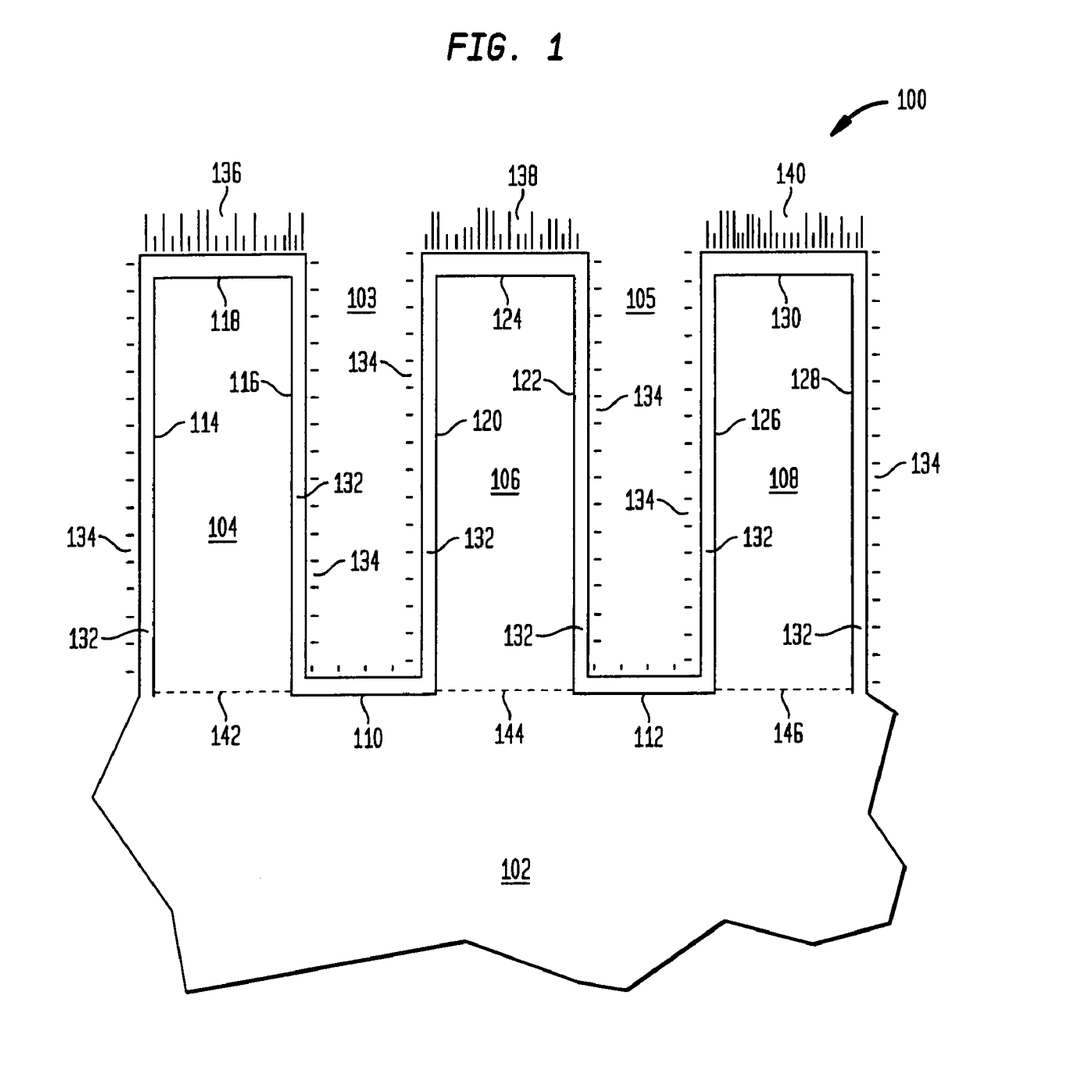
FIG. 1 shows an exemplary embodiment of a reversibly adaptive rough structure according to the present invention.

FIG. 1 shows a cross-section of a representative portion of an exemplary embodiment of a reversibly adaptive rough structure 100 according to the present invention on a substrate 102. Representative raised elements 104, 106 and 108 shown in exemplary FIG. 1 as posts, are spaced apart on the substrate 102 by channel bases 110 and 112 forming channels 103 and 105. Lateral surfaces 114 and 116 and distal end 118 of raised element 104, lateral surfaces 120 and 122 and distal end 124 of raised element 106, and lateral surfaces 126 and 128 and distal end 130 of raised element 108 are covered by a adhesion layer 132 having a surface comprising gold. The composition of the surface of adhesion layer 132 is selected to comprise gold, because gold forms covalent bonds with thiols. Although this discussion will be in the context of an adhesion layer 132 having a surface comprising gold, it is to be understood that other materials forming covalent bonds with thiols, such as metals including silver, platinum, palladium and copper for example, can also be used. Channel bases 110 and 112 of the substrate 102 between the representative raised elements 104, 106 and 108 are also covered by the adhesion layer 132 comprising gold. The entire surface of the adhesion layer 132, except for the portion of the adhesion layer 132 covering the distal ends 118, 124 and 130 of the raised elements 104, 106 and 108, is itself covered by a bristle SAM layer 134 of molecules comprising a thiol compound that itself comprises a hydrophobic moiety. The distal ends 118, 124 and 130 of the raised elements 104, 106 and 108, are covered by bristle layers 136, 138 and 140 respectively, each comprising both a thiol compound that itself comprises a hydrophobic moiety, and comprising a thiol compound that itself comprises a reversibly adaptive moiety.

The raised elements 104, 106 and 108 can take the form of any desired raised structures separated by channels 103 and 105 such as, for example, blades, posts, needles or lines. In another embodiment, the raised elements comprise a continuous and/or discontinuous labyrinthic raised surface separated by exemplary channels 103 and 105 on the substrate 102. The distal ends 118, 124 and 130 of the exemplary posts 104, 106 and 108 can have any desired shape, such as, for example, round, elliptical, triangular, square, rectangular, and/or polygonal. Although much of this discussion is presented in the context of such exemplary posts, it is to be understood that other structures separated by channels, such as blades, needles, lines, labyrinthic structures, or mixed structures, can also be used.

The spacing, height and other dimensions of the raised elements are matters of discretion. For example, the dimensions of the raised elements may be on the order of nanometers, angstroms or microns. In one embodiment, the maximum average diameter or width of the surfaces of the distal ends 118, 124 and 130 of these structures is about 60 microns. In another embodiment, the surfaces of the distal ends 118, 124 and 130 of these structures are in the form of lines or labyrinthic designs in which the maximum average width of an individual raised element is about 60 microns, and they can have an unlimited length. In another embodiment, the minimum average width of the surfaces of the distal ends 118, 124 and 130 of these structures is on the order of several hundreds of nanometers. In a further embodiment, raised elements are used in which the diameter of the surfaces of the distal ends is about 250 nanometers, the raised element height is about 7 microns, and the pitch, or channel distance between raised elements, is about 3 microns. In the context of this paragraph, width and diameter of the surface of the distal end of an individual raised element are collectively referred to as "lateral dimension". For example, in the case of a labyrinthic design, the lateral dimension is the width of a given portion of the surface of the distal end of an individual raised section of the labyrinth. These structures can be fabricated from, for example, silicon, silicon dioxide, other inorganic glasses, or an organic polymer. For convenience, all of these structures including those having dimensions in nanometers, angstroms, or microns, are collectively referred to herein as "rough structures". Background information on rough structures and their preparation is provided in Kim, Joonwon et al., *Rough structured Surfaces for Dramatic Reduction of Flow Resistance in Droplet-Based Microliquidics*, Technical Digest, Fifteenth IEEE International Conference on Micro Electro Mechanical Systems, February 2002, pp. 479-482, incorporated by reference above.

The reversibly adaptive moieties can be repeatedly modified successively to relatively hydrophobic and hydrophilic states by the application of external stimuli depending on the chemical and physical characteristics of the selected moieties such as, for example, changes in the surrounding pH, ionic strength, temperature, electromagnetic field, light, or mechanical stress. Referring to FIG. 1, it can be seen that the entire exposed surface of the reversibly adaptive rough structure 100 above the substrate 102 is hydrophobic, except for the distal ends 118, 124 and 130 of the representative raised elements 104, 106 and 108. It can also be seen that the distal ends 118, 124 and 130 of the representative raised elements 104, 106 and 108 are covered by bristle layers 136, 138 and 140 respectively. The bristle layers 136, 138 and 140 comprise both hydrophobic and reversibly adaptive moieties. The hydrophobic moieties in the bristle layers 136, 138 and 140 serve to fill pinholes that otherwise might be present in the layers. The reversibly adaptive moieties in the bristle layers 136, 138 and 140 can be reversibly rendered either relatively hydrophilic or relatively hydrophobic.

The reversibly adaptive rough structure 100 makes possible the wetting of the distal ends 118, 124 and 130 of the reversibly adaptive rough structure 100 without substantial wetting of any surfaces of the channels 103 and 105 in between the distal ends 118, 124 and 130 of the representative raised elements 104, 106 and 108. Hence, in their hydrophilic state, the reversibly adaptive moieties are wettable by an aqueous liquid applied to the reversibly adaptive rough structure 100. By "liquid" is meant a composition comprising a liquid phase in any desired form, such as a solution, suspension, dispersion, or emulsion, for example. The lateral surfaces 114 and 116 of raised element 104, lateral surfaces 120 and 122 of raised element 106, and lateral surfaces 126 and 128 of raised element 108, and channel bases 110 and 112 of the substrate 102, are all covered by the bristle layer 134 and hence are not wettable by the aqueous liquid. Upon reversal of the adaptive moieties to a relatively hydrophobic state, the aqueous liquid is repelled from and easily removed from the bristle layers 136, 138 and 140. Moreover, the consistently hydrophobic nature of all of the surfaces between the distal ends 118, 124 and 130 of the representative raised elements 104, 106 and 108 prevents the aqueous liquid from entering the channels 103 and 105 between the raised elements. Hence, not only can the hydrophilicity of the adaptive moieties be reversed, but the reversibly adaptive rough structure can be cleaned to completely remove the aqueous liquid with a minimized need for removing aqueous liquid from the channels 103 and 105 between the raised elements 104, 106 and 108.

In one embodiment the hydrophobic moieties have chain lengths that are longer than those of the reversibly adaptive moieties. As a result, the hydrophobic moieties dominate determination of the contact angle at the air-surface interface when the reversibly adaptive moieties are in a hydrophobic mode, resulting in a superhydrophobic surface. When the reversibly adaptive moieties are switched to the hydrophilic mode by appropriate external stimuli such as a change in temperature or pH, the reversibly adaptive moieties become swollen and extend away from the reversibly adaptive rough structure such that the reversibly adaptive moieties dominate determination of the contact angle at the air-surface interface. Hence, if the reversibly adaptive moieties become hydrophilic under the external stimuli, the surface becomes superhydrophilic.

Reversal of the hydrophilic or hydrophobic states of the reversibly adaptive moieties at the distal ends 118, 124 and 130 of the reversibly adaptive rough structure 100 changes both the local contact angle and the effective surface area of the reversibly adaptive rough structure. When in the hydrophilic state, the reversibly adaptive moieties extend outward away from the distal ends 118, 124 and 130, effectively increasing the surface area wettable by an aqueous liquid. At the same time, the hydrophilic state of the reversibly adaptive moieties decreases the apparent local contact angle of the distal ends 118, 124 and 130. When the reversibly adaptive moieties are in the hydrophobic state, the local contact angle accordingly increases, and the reversibly adaptive moieties retract away from any adjacent aqueous liquid, effectively further detracting from wettability of the distal ends 118, 124 and 130 by an aqueous liquid. In general, a contact angle of greater than about 90° is considered to be hydrophobic, and a contact angle of less than about 90° is considered to be hydrophilic. Contact angles within a range of between about 90° and about 120° are considered to be hydrophobic. Contact angles within a range of between about 150° and about 180° are considered to be superhydrophobic. In one embodiment, reversibly adaptive moieties are provided that can be induced by external stimuli into a relatively hydrophobic state having an apparent contact angle for aqueous liquids within a range of between about 140° and about 180°. In another embodiment, reversibly adaptive moieties are provided that can be induced by external stimuli into a relatively hydrophobic state having an apparent contact angle for aqueous liquids within a range of between about 150° and about 180°. In a further embodiment, reversibly adaptive moieties are provided that can be induced by external stimuli into a relatively hydrophilic state having an apparent contact angle for aqueous liquids within a range of between about 0° and about 30°. In an additional embodiment, reversibly adaptive moieties are provided that can be induced by external stimuli into a relatively hydrophilic state having an apparent contact angle for aqueous liquids within a range of between about 0° and about 15°.

For surfaces having contact angles greater than about 110°, the "Cassie model" of hydrophobicity and surface roughness is particularly useful. The Cassie model assumes that air is trapped below a drop of aqueous liquid sitting on the exemplary rough structure shown in FIG. 1, such that the liquid sits on a composite surface. See, for background information, "Wettability of Porous Surfaces", A. B. D. Cassie et al., *Trans. Farad. Soc.*, Vol. 40, pp. 546-551 (1944), which is hereby incorporated herein by reference in its entirety. For contact angles within a range of between slightly greater than about 90° up to about 110°, the "Wenzel model" of hydrophobicity and surface roughness is particularly useful. The Wenzel model regards surface area as being proportional to surface roughness. See, for background information, Wenzel, R. N., "Resistance of Solid Surfaces to Wetting by Water" *Ind. Eng. Chem.*, Vol. 28, pp. 988-994 (1936). Further background information regarding contact angle modification in rough structured surfaces is provided in Kim, Joonwon et al., "Nanostructured Surfaces for Dramatic Reduction of Flow Resistance in Droplet-Based Microliquidics", *Technical Digest, Fifteenth IEEE International Conference on Micro Electro Mechanical Systems*, pp. 479-482 (February 2002), the entirety of which is hereby incorporated herein by reference.

The bristle layers 136, 138 and 140 as discussed above in connection with FIG. 1 comprise a thiol molecule that itself comprises a reversibly adaptive moiety. In one embodiment, the thiol molecule is constituted by a thiolated monomer, oligomer or polymer. The terms "oligomer" and "polymer" as used in this specification broadly include molecules and macromolecules of any suitable average molecular weight, provided that they can be effectively formed into a self-assembled monolayer ("SAM"). In this embodiment, the thiol molecules are bonded through the thiol groups to the adhesion layer 132 as shown in FIG. 1. In this regard, the thiol molecule desirably has a somewhat elongated structure, such that bonding of the thiol group effectively disposes the reversibly adaptive moiety in a direction generally away from the substrate 102. Desirably, the thiol molecule has thiol functionality only at one end of the elongated structure, and reversibly adaptive functionality only at the other end. In one embodiment, each thiol molecule has only one thiol moiety. In another embodiment, each thiol molecule has only one reversibly adaptive functionality. See, for example, B. Zhao et al., "Polymer Brushes: Surface Immobilized Macromolecules", *Prog. Poly. Sci.*, Vol. 25, pp. 677-710 (2000), the entirety of which is hereby incorporated herein by reference.

Exemplary molecules comprising reversibly adaptive moieties that can be thiolated for use in making the bristle layers 136, 138 and 140 include poly(N-isopropylacrylamide) (which is also known as "PNiPAAm"), poly[(meth)acrylic acid)] (which is also known as "P(M)AA", as "poly(methacrylic acid)" and as "PMAA"), poly(ethylene glycol) (which is also known as "PEG"), and poly(acrylic acid) (which is also known as "PAA"). Exemplary monomers that can be employed to prepare temperature-sensitive hydrogels that can be thiolated include: N-acryloylpyrrolidine, N-acryloyl piperidine, N-isopropylacrylamide (which is also known as "NIPAM"), N-vinylisobutyramide, methylenebisacrylamide (which is also known as "BA"), N-isopropylmethacrylamide, and N-diethylacrylamide. See, for example, T. Sun et al., "Reversible Switching Between Superhydrophilicity and Superhydrophobicity", *Angew. Chem. Int. Ed.*, Vol. 43, pp.

357-360 (2004); T. Okano et al., "Temperature-Responsive Poly(N-isopropyl Acrylamide) as a Modulator for Alteration of Hydrophilic-Hydrophobic Surface Properties to Control Activation/Inactivation of Platelets", *Journal of Controlled Release*, Vol. 36, pp. 125-133 (1995); and Pelton, R., "Temperature-Sensitive Aqueous Microgels", *Advances in Colloid &Interface Science*, Vol. 85, pp. 1-33 (2000). The entireties of all of the foregoing documents are hereby incorporated herein by reference.

Many of theses exemplary molecules have temperature sensitive hydrophobicity and hydrophilicity. For example, the lower critical solution temperature ("LCST") of PNiPAAm in water is 32° Centigrade ("C"). At temperatures below about 32° C., PNiPAAm is relatively hydrophilic and may absorb up to about 80% by volume of water, forming a swollen hydrogel. At temperatures above about 32° C., PNiPAAm becomes relatively hydrophobic as the polymer chains precipitates out of water and the hydrophobic isopropyl groups are exposed.

The bristle layers 136, 138 and 140 as discussed above in connection with FIG. 1 further comprise a thiol molecule that itself comprises a hydrophobic moiety. Furthermore, such thiol molecules are also employed in making the bristle layer 134. In one embodiment, the thiol molecule is constituted by a thiolated monomer, oligomer or polymer. The thiol molecule desirably has a somewhat elongated structure, such that bonding of the thiol group effectively disposes the hydrophobic moiety in a direction generally away from the substrate 102. Desirably, the thiol molecule has thiol functionality only at one end of the elongated structure, and hydrophobic functionality only at the other end. In one embodiment, each thiol molecule has only one thiol moiety. In another embodiment, each thiol molecule has only one hydrophobic functionality.

Exemplary thiolated molecules comprising hydrophobic moieties for use in making the layers 134, 136, 138 and 140 include poly(styrene-co-2,3,4,5,6-pentafluorostyrene-SH) (which is also known as "PSt-co-PSF-SH"), and poly(methyl methacrylate-co-pentafluorooctyl methacrylate-SH) (which is also known as "PMMA-co-PFOMA-SH").

In one embodiment, the hydrophobic thiol molecules comprise poly(styrene-co-2,3,4,5,6-pentafluorostyrene-SH) (which is also known as "PSt-co-PSF-SH"), and the reversibly adaptive thiol molecules comprise poly(N-isopropyl acrylamide-SH) (also referred to as "PNIPAAm-SH"). In another embodiment, the hydrophobic thiol molecules comprise poly(methyl methacrylate-co-pentafluorooctyl methacrylate-SH) (which is also known as "PMMA-co-PFOMA-SH), and the reversibly adaptive thiol molecules comprise poly(N-isopropyl acrylamide-SH) (also referred to as "PNIPAAm-SH").

In an alternative embodiment, the layer 134 is constituted by a hydrophobic coating taking the place of the bristles discussed above. Hence, molecules not necessarily comprising an elongated structure, which may instead take the form of a coating having a smoother surface than such bristles, can be employed. Such molecules comprise hydrophobic moieties that are positioned in the layer 134 facing away from adjacent portions of the raised elements 104, 106 and 108 and facing away from adjacent portions of the channel bases 110 and 112. In this embodiment, any composition suitable for forming a coating or layer covalently bonded to such adjacent portions and comprising such hydrophobic moieties can be employed. For example, monomers, oligomers and polymers having compositions similar to those discussed above for making layer 134 in the form of bristles, but comprising reduced elongated molecule regions or otherwise bound to the raised elements 104, 106 and 108 and the channel bases 110 and 112 in a smoother manner than such bristles can be employed.

Figure 2:
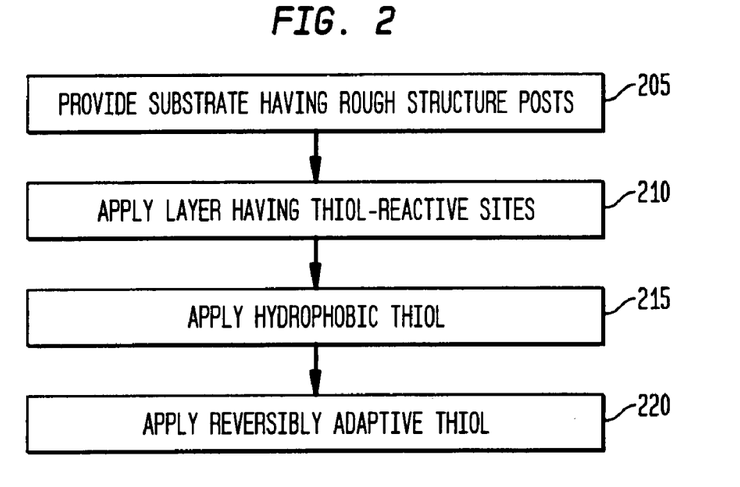
FIG. 2 shows a process for making the reversibly adaptive rough structure of FIG. 1.

FIG. 2 shows an exemplary process 200 that is suitable for preparing the reversibly adaptive rough structure 100 shown in FIG. 1. In step 205, substrate 102 having representative rough structure raised elements 104, 106 and 108 separated by channels 103 and 105 is provided. In one embodiment, the rough structure raised elements 104-108 are integrally formed with the substrate 102. In another embodiment, the rough structure raised elements 104-108 are formed on the substrate 102, where they intersect with and are bonded to the substrate at dotted lines 142, 144 and 146.

In step 210, the lateral surfaces 114 and 116 and distal end 118 of raised element 104, the lateral surfaces 120 and 122 and distal end 124 of raised element 106, the lateral surfaces 126 and 128 and distal end 130 of raised element 108, and channel bases 110 and 112 are covered by the adhesion layer 132 having thiol reactive sites. A layer of an adhesion promoter, such as a composition comprising titanium or chromium, is desirably deposited coextensively between the substrate 102 and the adhesion layer 132 in order to improve adhesion of the adhesion layer 132. Suitable thicknesses for the titanium layer and the adhesion layer 132 are, for example, about 2 nanometers (nm) and about 50 nm, respectively. Step 210 can be carried out, for example, by vapor deposition.

In step 215, thiolated molecules comprising hydrophobic moieties are applied coextensively with the adhesion layer 132, forming the bristle layer 134. For example, a hydrophobic thiol ink can be prepared comprising a 10 millimolar ("mM") solution of the thiolated molecules in ethanol or methanol. The thiol ink solution is then applied using any suitable process to the adhesion layer 132. For example, the substrate 102 can be soaked in the thiol ink solution, followed by washing with a solvent to remove unbound ink and drying with an inert gas such as nitrogen. By "inert" is meant a gas that will not adversely affect the chemistry or structure of the reversibly adaptive rough structure. For example, a soaking time within a range of between about 3 hours and about 18 hours can be employed. The thiol groups react with the adhesion layer 132 and leave the rough structure 100 coated with bristle layer 134 having exposed hydrophobic moieties. In general, suitable exemplary concentrations for thiol ink solutions are within a range of between about 1 and about 20 millimoles of thiol molecules per liter of solvent. Other suitable concentrations can be used.

In step 220, thiolated molecules comprising reversibly adaptive moieties are applied to the distal ends 118, 124 and 130 of the raised elements 104, 106 and 108, respectively. The thiolated molecules comprising reversibly adaptive moieties exchange with some of the thiolated molecules comprising hydrophobic moieties, producing bound reversibly adaptive moieties at the distal ends 118, 124 and 130 of the rough structure 100. In this manner, bristle SAMs 136, 138 and 140 comprising thiols having both hydrophobic moieties and having reversibly adaptive moieties are bonded through the thiol groups to the distal ends 118, 124 and 130, respectively. For example, the reversibly adaptive thiol ink can be applied to the distal ends 118, 124 and 130 using a polydimethylsiloxane ("PDMS") stamp as a transfer medium. For example, a reversibly adaptive thiol ink can be prepared comprising a 10 mM solution of the thiolated molecules in ethanol or methanol. The PDMS stamp is soaked in the ink and then dried by an inert gas such as nitrogen. The ink on the PDMS stamp is then gently applied to the distal ends 118, 124 and 130 where it reacts with the adhesion layer 132, leaving the reversibly adaptive groups extending away from the rough structure. The substrate 102 is then desirably heated to complete the reaction, such as at a temperature of about 45° C. for about 30 minutes. Alternatively, for example, a droplet of the reversibly adaptive thiol ink can be rolled onto the distal ends 118, 124 and 130 of the raised elements 104, 106 and 108 respectively, to cause the exchange. By controlling the surface energy of the ink droplet, such as by employing water mixed with methanol or ethanol as the ink solvent, the surface energy of the liquid can be effectively adjusted downward as compared to that of water so that the ink droplet will wet the distal ends 118, 124 and 130 of the raised elements. However, the surface energy should not be lowered to completely wet the raised elements such that the droplet will wet both the distal ends 118, 124 and 130 and the channels 103 and 105. In one embodiment, the concentration of methanol or ethanol in water is controlled so that the surface energy of the ink solution is no greater than about 50 milliNewtons per meter (mN/m) and no less than about 20 mN/m. A surface energy in excess of about 50 mN/m may hinder wetting of the distal ends 118, 124 and 130 by the ink. A surface energy of less than about 20 mN/m may result in undesired wetting of the channels 103 and 105. Excess reversibly adaptive ink can then be washed away by a suitable solvent, followed by drying of the rough structure 100 in an inert gas such as nitrogen.

Figure 3:
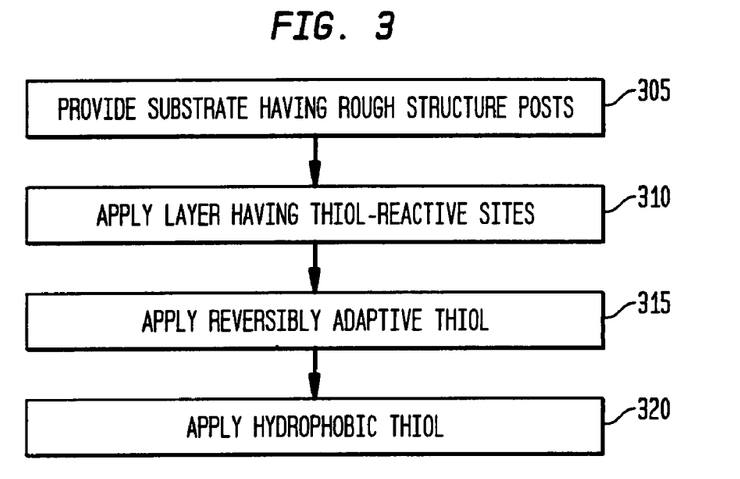
FIG. 3 shows an additional process for making the reversibly adaptive rough structure of FIG. 1.

FIG. 3 shows an exemplary alternative process 300 that is also suitable for preparing the reversibly adaptive rough structure 100 shown in FIG. 1. In step 305, substrate 102 having representative raised elements 104, 106 and 108 is provided in the same manner as previously discussed in connection with step 205. In step 310, the adhesion layer 132 is provided in the same manner as discussed in connection with step 210.

In step 315, thiolated molecules comprising reversibly adaptive moieties are applied to the distal ends 118, 124 and 130 of the raised elements 104, 106 and 108, respectively. For example, a reversibly adaptive thiol ink can be prepared as earlier discussed. The reversibly adaptive thiol ink can then be taken up in an absorbent medium such as a PDMS stamp as discussed above in connection with step 220, and applied to the distal ends 118, 124 and 130. Excess reversibly adaptive ink can then be washed away by a suitable solvent, followed by drying of the rough structure 100 in an inert gas such as nitrogen. The thiolated molecules then form a SAM on the distal ends 118, 124 and 130, bonded through the thiol groups, leaving the reversibly adaptive groups extending away from the substrate 102.

In step 320, thiolated molecules comprising hydrophobic moieties are applied coextensively with the adhesion layer 132, forming the bristle layer 134. The thiolated molecules comprising hydrophobic moieties also exchange with some of the molecules comprising reversibly adaptive moieties at the distal ends 118, 124 and 130 of the reversibly adaptive rough structure 100. In this manner, bristle SAMs 136, 138 and 140 comprising thiols having both hydrophobic moieties and having reversibly adaptive moieties is bonded through the thiol groups to the distal ends 118, 124 and 130. For example, a hydrophobic thiol ink can be prepared as earlier discussed. The substrate 102 can then be soaked in the hydrophobic thiol ink, and the excess subsequently removed, for example by washing the substrate 102 in a suitable solvent and then drying it in an inert gas such as nitrogen.

Figure 4:
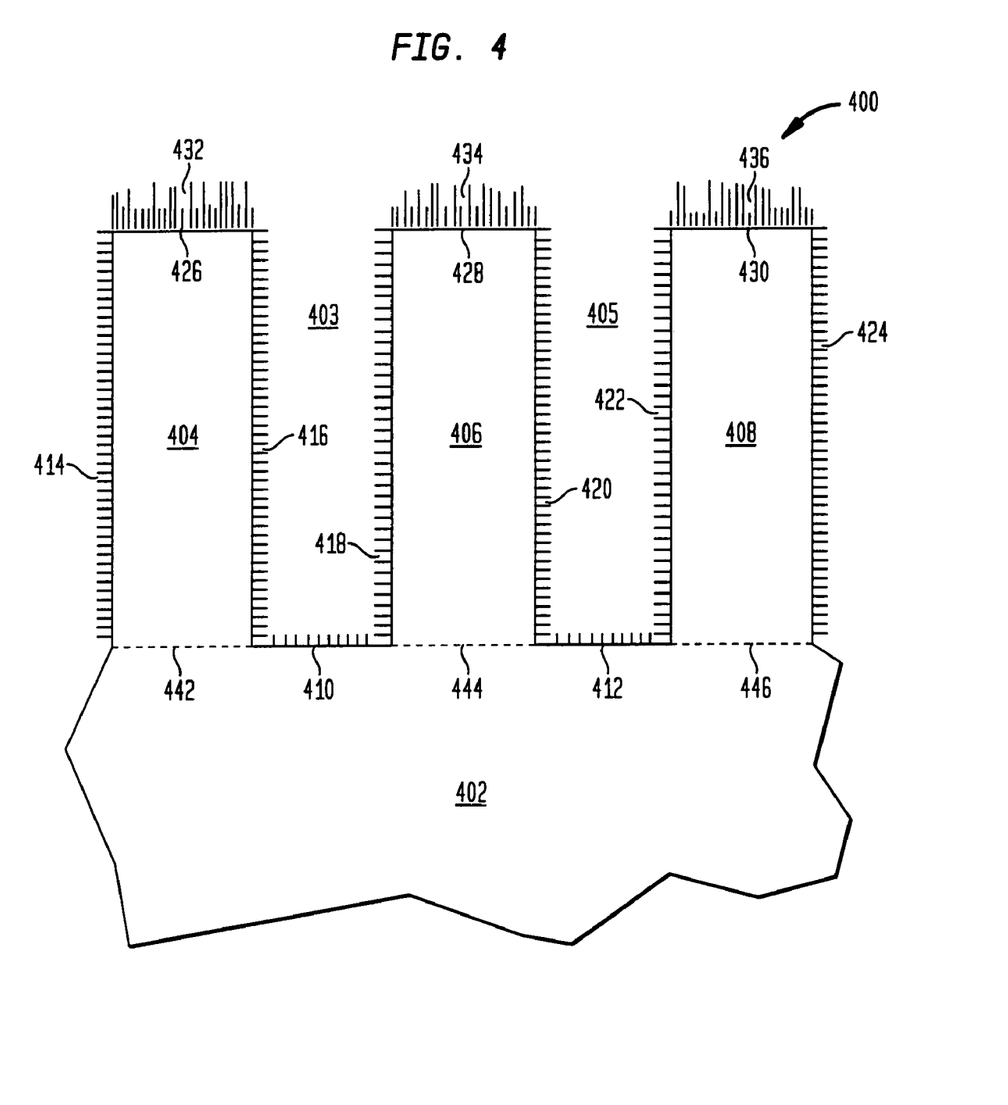
FIG. 4 shows another exemplary embodiment of a reversibly adaptive rough structure according to the present invention.

FIG. 4 shows a cross-section of a representative portion of an alternative exemplary embodiment of a reversibly adaptive rough structure 400 on a substrate 402. Representative raised elements 404, 406 and 408 are spaced apart on the substrate 402 by channel bases 410 and 412, forming channels 403 and 405. Lateral surfaces 414 and 416 of raised element 404, lateral surfaces 418 and 420 of raised element 406, and lateral surfaces 422 and 424 of raised element 408 comprise a bristle SAM of molecules bonded to said sides and having hydrophobic moieties extending away from the substrate. Channel bases 410 and 412 of the substrate 102 between the representative raised elements 404, 406 and 408 also comprise a SAM of molecules bonded to said regions and having hydrophobic moieties extending away from the substrate. The distal ends 426, 428 and 430 of the raised elements 404, 406 and 408 comprise bristle SAMs 432, 434 and 436 of molecules bonded to such distal ends. The bristle SAMs 432, 434 and 436 comprise molecules having hydrophobic moieties extending away from the substrate, and molecules having reversibly adaptive moieties extending away from the substrate. The molecules having hydrophobic moieties and having reversibly adaptive moieties are shown in FIG. 4 as short and long lines, respectively. The reversibly adaptive moieties can exist both in relatively hydrophilic and relatively hydrophobic states. In an alternative embodiment, the lateral surfaces 414 and 416 of raised element 404, lateral surfaces 418 and 420 of raised element 406, and lateral surfaces 422 and 424 of raised element 408 comprise a hydrophobic coating taking the place of the bristle SAM discussed above and having hydrophobic moieties extending away from such surfaces.

Figure 5:
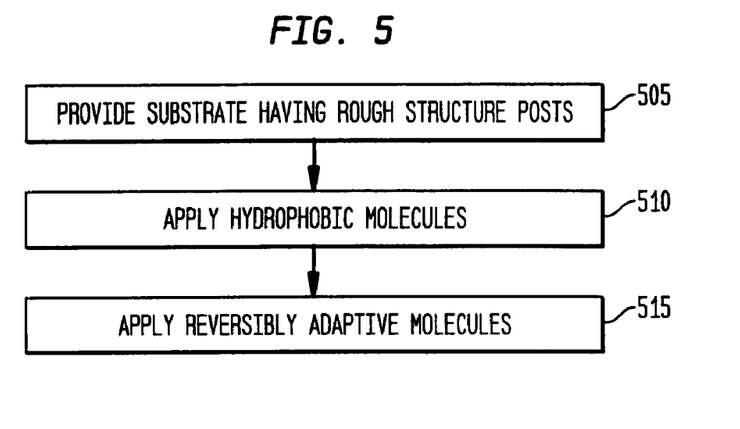
FIG. 5 shows a process for making the reversibly adaptive rough structure of FIG. 4.

FIG. 5 shows an exemplary process 500 that is suitable for preparing the reversibly adaptive rough structure 400 shown in FIG. 4. In step 505, substrate 402 having representative raised elements 404, 406 and 408 is provided in the same manner as discussed above in connection with step 205 of FIG. 2. In one embodiment, the rough structure raised elements 404-408 are integrally formed with the substrate 402. In another embodiment, the rough structure raised elements 404-408 are formed on the substrate 402, where they intersect with and are bonded to the substrate at dotted lines 442, 444 and 446.

In step 510, molecules comprising hydrophobic moieties are applied to the raised elements 404, 406 and 408 and to the channel bases 410 and 412. These molecules are generally selected in the same manner as discussed above concerning the hydrophobic thiols, except that the thiol moieties are replaced by raised element-reactive moieties that can covalently bond with the surfaces of the raised elements 404, 406 and 408 or with initiators immobilized on such raised elements as will be discussed below. For example, in cases where the raised elements 404, 406 and 408 are fabricated from compositions comprising silicon, silicon dioxide, another glass, or an organic polymer, the raised element-reactive moieties are selected from among those that readily react with or can be induced to react with the composition of the raised elements. For example, where the raised elements comprise silicon, triethoxysilane groups can constitute the raised element-reactive moieties. In one embodiment, the molecules are raised element-reactive molecules constituted by raised element-reactive monomers, oligomers or polymers. The raised element-reactive molecules desirably have a somewhat elongated structure, such that bonding of the raised element-reactive moiety to the raised elements 404, 406 and 408 and to the channel bases 410 and 412 effectively disposes the hydrophobic moieties in a direction generally away from the substrate 402. Desirably, the molecules have a raised element-reactive functionality only at one end of the elongated structure, and a hydrophobic functionality only at the other end. In one embodiment, each molecule has only one raised element-reactive moiety. In another embodiment, each raised element-reactive molecule has only one hydrophobic functionality.

The raised element-reactive molecules comprising hydrophobic moieties can be applied to the raised elements 404, 406 and 408 and to the channel bases 410 and 412 by any suitable process. For example, the substrate 402 can be dipped into a solution of raised element-reactive molecules comprising hydrophobic moieties dissolved in a suitable solvent in the same concentration as discussed in connection with step 215 of FIG. 2. The unbonded excess solution is then removed, for example by washing the substrate 402 in a suitable solvent and then drying it in an inert gas such as nitrogen.

In step 515, raised element-reactive molecules comprising reversibly adaptive moieties are applied to the distal ends 426, 428 and 430 of the raised elements 404, 406 and 408, respectively. These raised element-reactive molecules comprising reversibly adaptive moieties exchange with some of the raised element-reactive molecules comprising hydrophobic moieties, bonding the reversibly adaptive moieties at the distal ends 426, 428 and 430 of the reversibly adaptive rough structure 400. In this manner, bristle SAMs 432, 434 and 436 comprising raised element-reactive molecules having both hydrophobic moieties and having reversibly adaptive moieties are bonded through the raised element-reactive groups to the distal ends 426, 428 and 430. For example, a solution of raised element-reactive molecules comprising reversibly adaptive moieties can be prepared as earlier discussed. The solution can then be taken up in an absorbent medium such as a PDMS stamp, and applied to the distal ends 426, 428 and 430. The raised element-reactive molecules then form SAMs on the distal ends 426, 428 and 430, bonded through the raised element-reactive groups, leaving the reversibly adaptive groups extending away from the substrate 402. Alternatively, for example, a droplet of the reversibly adaptive thiol ink can be rolled onto the distal ends 426, 428 and 430 of the raised elements 404, 406 and 408, respectively to cause the exchange. Excess reversibly adaptive ink can then be washed away by a suitable solvent, followed by drying of the rough structure 400 in an inert gas such as nitrogen.

Figure 6:
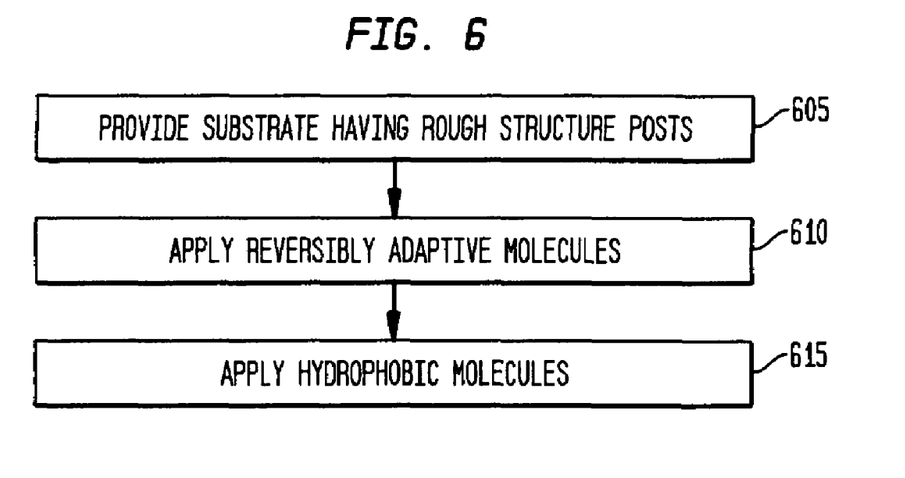
FIG. 6 shows another process for making the reversibly adaptive rough structure of FIG. 4.

FIG. 6 shows an exemplary alternative process 600 that is also suitable for preparing the reversibly adaptive rough structure 400 shown in FIG. 4. In step 605, substrate 402 having representative raised elements 404, 406 and 408 is provided in the same manner as previously discussed in connection with step 205 of FIG. 2.

In step 610, raised element-reactive molecules comprising reversibly adaptive moieties are applied to the distal ends 426, 428 and 430 of the raised elements 404, 406 and 408, respectively. For example, a solution of raised element-reactive molecules comprising reversibly adaptive moieties can be prepared as earlier discussed and applied using a PDMS stamp in the same manner as discussed in connection with step 515 of FIG. 5. Excess reversibly adaptive ink can then be washed away by a suitable solvent, followed by drying of the rough structure 100 in an inert gas such as nitrogen.

In step 615, raised element-reactive molecules comprising hydrophobic moieties are applied to all exposed surfaces of the substrate 402, forming a SAM of molecules having hydrophobic moieties extending away from the substrate, bonded to the lateral surfaces 414 and 416 of raised element 404, the lateral surfaces 418 and 420 of raised element 406, the lateral surfaces 422 and 424 of raised element 408, and channel bases 410 and 412. The raised element-reactive molecules comprising hydrophobic moieties also exchange with some of the molecules comprising reversibly adaptive moieties at the distal ends 426, 428 and 430 of the reversibly adaptive rough structure 400. In this manner, bristle SAMs 432, 434 and 436 comprising molecules having both hydrophobic moieties and having reversibly adaptive moieties is bonded through the raised element-reactive groups to the distal ends 426, 428 and 430. For example, a solution of raised element-reactive molecules comprising hydrophobic moieties can be prepared as earlier discussed. The substrate 402 can then be soaked in the solution, and the excess subsequently removed, for example by washing in a suitable solvent and drying in an inert gas such as nitrogen.

Figure 7:
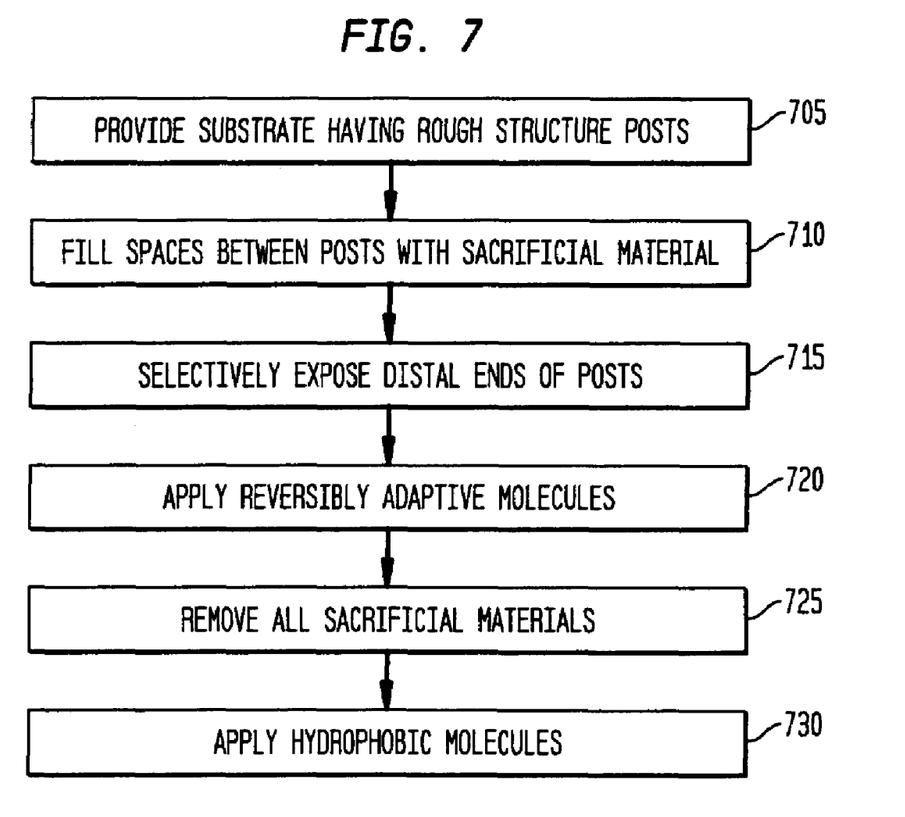
FIG. 7 shows a further process for making the reversibly adaptive rough structure of FIG. 4.

FIG. 7 shows another exemplary alternative process 700 that is also suitable for preparing the reversibly adaptive rough structure 400 shown in FIG. 4. In step 705, substrate 402 having representative raised elements 404, 406 and 408 is provided in the same manner as previously discussed.

In step 710, the channels 403 and 405 between the raised elements 404, 406 and 408 are temporarily filled with a sacrificial material. The sacrificial material to be used can be any material that can be temporarily filled into the channels 403 and 405 to block reaction of surfaces of the channels 403 and 405 with raised element-reactive molecules until the sacrificial materials are subsequently removed. For example, the sacrificial material can be a positive tone photoresist, susceptible to later removal. Positive tone resists can be removed, for example, by application of an appropriate solvent such as acetone, by patterned exposure to light followed by selective removal of the degraded portion with an aqueous base, or by etching such as reactive ion etching. Negative tone photoresists can also be used, provided that they can be effectively removed to expose the channels 403 and 405.

In step 715, the sacrificial material is selectively removed from the distal ends 426, 428, and 430. For example, a PDMS stamp soaked in a suitable solvent for the sacrificial material can be repeatedly applied to the exposed surface of the substrate 402 until the distal ends 426, 428 and 430 are exposed. Alternatively, for example, the sacrificial material can be suitably etched to achieve the same exposure. Photoresists, for example, can be etched by an oxygen plasma.

In step 720, raised element-reactive molecules comprising reversibly adaptive moieties are applied to the distal ends 426, 428 and 430 of the raised elements 404, 406 and 408, respectively. For example, a solution of raised element-reactive molecules comprising reversibly adaptive moieties can be prepared as earlier discussed and applied in the same manner as discussed in connection with step 515 of FIG. 5. Excess reversibly adaptive ink can then be washed away by a suitable solvent, followed by drying of the rough structure 400 in an inert gas such as nitrogen. In step 725, the sacrificial material is removed from the substrate 402, exposing the lateral surfaces 414 and 416 of raised element 404, the lateral surfaces 418 and 420 of raised element 406, the lateral surfaces 422 and 424 of raised element 408, and channel bases 410 and 412.

In step 730, raised element-reactive molecules comprising hydrophobic moieties are applied to all exposed surfaces of the substrate 402, forming a SAM of molecules having hydrophobic moieties extending away from the substrate, bonded to the lateral surfaces 414 and 416 of raised element 404, the lateral surfaces 418 and 420 of raised element 406, the lateral surfaces 422 and 424 of raised element 408, and channel bases 410 and 412. The raised element-reactive molecules comprising hydrophobic moieties also exchange with some of the molecules comprising reversibly adaptive moieties at the distal ends 426, 428 and 430 of the reversibly adaptive rough structure 400. In this manner, bristle SAMs 432, 434 and 436 comprising molecules having both hydrophobic moieties and having reversibly adaptive moieties are bonded through the raised element-reactive moieties to the distal ends 426, 428 and 430. For example, a solution of raised element-reactive molecules comprising hydrophobic moieties can be prepared as earlier discussed in connection with step 510. The substrate 402 can then be soaked in the solution, and the excess subsequently removed, for example by washing in a suitable solvent followed by drying in nitrogen.

In one embodiment, raised element-reactive moieties are bonded to raised elements 404, 406 and 408 and channel bases 410 and 412 following immobilization of suitable initiators on such raised elements and regions. For example, the raised elements and regions can be functionalized with reactive groups such as hydroxyl or amino groups, with which raised element-reactive moieties then react. Application of heat may be needed to effectuate these reactions. Further for example, where the raised elements and regions comprise silicon, triethoxysilane compounds with end groups that can react with the desired molecules comprising hydrophobic and reversibly adaptive moieties can first be bonded to the silicon. In illustration, aminopropyl triethoxysilane can be bonded to silicon, and the amino group can then react with a carboxylic acid group in the selected molecules comprising hydrophobic and reversibly adaptive moieties. Such an approach can also be used with raised elements comprising an organic chemical material, for example, to introduce an end-functionalized organic chemical initiator onto the rough structure to initiate subsequent bonding of both hydrophobic and adaptive moieties. In one embodiment, surface-initiated atom transfer radical polymerization is employed. See, for example: J. D. Jeyaprakash et al., *Macromol. Rapid Commun.*, Vol. 23, pp. 277-281 (2002); Singh, et al., *Polymer*, Vol. 44, pp. 7645-7649 (2003); N. Luo et al., "Surface Grafting of Polyacrylamide from Polyethylene-Based Copolymer Film", *J. Appl. Poly. Sci.*, Vol. 92, pp. 1589-1595 (2004); and Fukuda et al., *Macromolecules* Vol. 33, pp. 2870-2874 (2000), the entireties of all such documents being hereby incorporated herein by reference. In another embodiment, surface-initiated radical polymerization is employed. See, for example, M. Lemieux et al., *Macromolecules*, Vol. 36, No. 19, p. 7244 (2003), the entirety of which is hereby incorporated herein by reference. Further free radical initiators and methods for making SAMs are disclosed in Paul, R., et al., "Photoinitiated Polymerization of Styrene from Self-Assembled Monolayers on Gold. II. Grafting Rates and Extraction", *J. Polym. Sci., Part A: Polymer Chem.*, Vol. 40, pp. 3284-3291 (2002), the entirety of which is hereby incorporated herein by reference.

Embodiments discussed herein not employing initiators are particularly useful for preparing monolayers having a thickness of less than about ten nanometers and having a grafting density within a range of between about 2 milligrams per square meter ($mg/m^2$) and about 10 $mg/m^2$. Embodiments employing initiators can facilitate a greater grafting density, within a range of between about 15 $mg/m^2$ and about 100 $mg/m^2$, but may also result in multilayers having thicknesses of up to hundreds of nanometers. The density of grafting of polymers having hydrophobic and adaptive moieties can be controlled by controlling the absorption density of initiators. Where initiators are not employed, the chain length and branching in polymers can be used to moderate steric hindrance factors in order to control the grafting density.

In one embodiment, the hydrophobic raised element-reactive molecules comprise poly(styrene-co-2,3,4,5,6-pentafluorostyrene-co-acrylic acid/Azidophenyl) (which is also known as PSt-co-PSF-co-PAA/Az), and the reversibly adaptive raised element-reactive molecules comprise poly(N-isopropyl acrylamide-co-acrylic acid/Azidophenyl) (which is also known as PNIPAAm-co-PAA/Az). In another embodiment, the hydrophobic raised element-reactive molecules comprise poly(methyl methacrylate-co-pentafluorooctyl methacrylate-co-acrylic acid/Azidophenyl) (which is also known as MMA-co-PFOMA-co-PAA/Az), and the reversibly adaptive raised element-reactive molecules comprise poly(N-isopropyl acrylamide-co-acrylic acid/Azidophenyl) (which is also known as PNIPAAm-co-PAA/Az). In a further embodiment, the hydrophobic raised element-reactive molecules comprise carboxylated poly(styrene-co-2,3,4,5,6-pentafluorostyrene) (which is also known as "PSt-co-PSF-COOH"), and the reversibly adaptive raised element-reactive molecules comprise carboxylated poly(N-isopropyl acrylamide) (which is also known as "PNIPAAm-COOH"). In an additional embodiment, the hydrophobic raised element-reactive molecules comprise azidophenylated poly(styrene-co-2,3,4,5,6-pentafluorostyrene) (which is also known as "PSt-co-PSF-Az"), and the reversibly adaptive raised element-reactive molecules comprise azidophenylated poly(N-isopropyl acrylamide) (which is also known as "PNIPAAm-Az").

The reversibly adaptive rough structure produced according to the present invention has end-use applications in controlled microfluidic switches, controlled release of chemicals including small molecules as well as proteins and other macromolecules, chemical and biological sensors, adaptive and selective membranes and filters, and adaptive textiles such as clothing and carpeting. In a controlled microfluidic switch, such as incorporated into a lab-on-a-chip, liquid will pass through microfluidic channels at a relatively lower temperature when the rough structure surface becomes hydrophilic; and will not pass through at a higher temperature where the rough structure surface becomes hydrophobic. See, for example, H. Liu et al., "Cell Attachment and Detachment on Micropattern-Immobilized Poly(N-Isopropyl Acrylamide) with Gelatin", *Lab Chip*, pp. 175-178 (2002); and Y. Ito et al., "Patterned Immobilization of Thermoresponsive Polymer", *Langmuir*, Vol. 13, pp. 2756-2759 (1997), the entireties of both of which are hereby incorporated herein by reference. Such a device can provide wetting on demand, and may be self-cleaning. For example, a laser can be used with such a device or any other device incorporating reversibly adaptive rough structures that respond to temperature changes, to induce spatially controlled temperature changes. Hence, spatially controlled changes in hydrophobic and hydrophilic behavior can be induced in a reversibly adaptive rough structure. Microreactors can also be fabricated incorporating rough structures to control flow of liquids. In a controlled release device, a drug, nutrient, reactive biomolecule or other agent to be released or activated can either be embedded in or attached to the reversibly adaptive polymer. Upon controlled inducement of hydrophilicity in the rough structure, the agent will be released, or at least exposed and activated. In chemical and biological sensors, hydrophilicity induced in the rough structure by an external stimulus such as a change in pH, ionic strength, temperature, electromagnetic field, light, or stress, can permit reaction between activators and chromophores or ligands having chromophore labels, causing a color change. Dynamic wavelength selective filters can change their wavelength selection characteristics in response to the environment. In adaptive clothing, the clothes can change their wettability in response to the environment, switching from a water super-repellant state to a water super-wettable state while still maintaining insulation of heat radiated from the body. Clothing and other textiles can also change colors in response to changes in the environment, which may be of particular use, for example, in military applications.

A variety of adaptive and selective membranes and filters can be fabricated, such that the membrane and filter characteristics are changed by the rough structure in response to external stimuli. For example, an applied signal can switch the rough structure between hydrophobic and hydrophilic states, changing the pore size of the membrane or filter. See, for example, Yoshihiro Ito, et al., *Polym. Adv. Technol.*, Vol. 11, pp. 136-144 (2000); T. Kinoshita, *J. Photochem. Photobio. B: Biology*, Vol. 42, pp. 12-19 (1998); and Y. S. Park et al., *Langmuir*, Vol. 14, pp. 910-914 (1998), the entireties of all of which are hereby incorporated herein by reference.

While the present invention has been disclosed in a presently preferred context, it will be recognized that the present teachings may be adapted to a variety of contexts consistent with this disclosure and the claims that follow. For example, additional processes for making the reversibly adaptive rough structures may be practical. Facilitation of selective placement of the reversibly adaptive moieties at the distal ends of the raised elements is an important consideration in developing such processes. Further for example, additional initiators and binding schemes can potentially be developed for anchoring the hydrophobic and reversibly adaptive moieties to intended portions of the substrate. The processes of the invention are applicable to providing reversibly adaptive surfaces on other surfaces having roughness that is equivalent to the raised elements on a substrate as defined herein.

We claim:

1. A reversibly adaptive rough structure, comprising:
    a substrate;
    a plurality of raised elements on said substrate, said raised elements mutually spaced apart by channel regions on said substrate, each of said raised elements having a lateral surface and a distal end;
    said lateral surfaces, said distal ends and said channel regions having hydrophobic molecules thereon; and
    said distal ends having reversibly adaptive bristles thereon, said distal ends being selectively convertible from a relatively hydrophobic state to a relatively hydrophilic state by the application of an external stimulus while said lateral surfaces remain hydrophobic.

2. The reversibly adaptive rough structure of claim 1, in which each of said hydrophobic molecules comprises a first end bonded to one of said lateral surfaces, said distal ends or one of said channel regions; and each of said hydrophobic molecules comprises a second end unbound to any of the distal ends and an elongated region interposed between said first and second ends.

3. The reversibly adaptive rough structure of claim 1, further comprising an adhesion layer on said raised elements and channel regions, said adhesion layer underlying hydrophobic molecules.

4. The reversibly adaptive rough structure of claim 3, in which said adhesion layer comprises a thiol-binding surface.

5. The reversibly adaptive rough structure of claim 1, in which said distal ends have a surface shape selected from the group consisting of: round, elliptical, triangular, square, rectangular, polygonal, and labyrinthic.

6. The reversibly adaptive rough structure of claim 1, comprising raised elements in the form of needles formed by tapering of said lateral surfaces toward said distal ends.

7. The reversibly adaptive rough structure of claim 1, in which each of said distal ends has an average lateral dimension of less than about 60 microns.

8. The reversibly adaptive rough structure of claim 1, in which said hydrophobic state is characterized by being able to produce a contact angle for an aqueous liquid within a range of between about 140° and about 180°.

9. The reversibly adaptive rough structure of claim 1, in which said hydrophilic state is characterized by being able to produce a contact angle for an aqueous liquid within a range of between about 0° and about 30°.

10. The reversibly adaptive rough structure of claim 1, in which each reversibly adaptive bristle comprises a first end bonded to one of said distal ends, a second end unbound to any of the distal ends, and an elongated region having a first average length interposed between said first and second ends; said second ends being convertible between relatively hydrophilic and hydrophobic states by the application of an external stimulus.

11. The reversibly adaptive rough structure of claim 10, in which said hydrophobic molecules comprise hydrophobic bristles, each hydrophobic bristle comprising a first end bonded to one of said lateral surfaces, one of said distal ends or one of said channel regions; and each of said hydrophobic bristles comprises a second end unbound to any of the distal ends and an elongated region having a second average length interposed between said first and second ends; said second average length being greater than said first average length.

12. A process for making a reversibly adaptive rough structure, comprising the steps of:
    providing a substrate;
    providing a plurality of raised elements on said substrate, said raised elements mutually spaced apart by channel regions on said substrate, each of said raised elements having a lateral surface and a distal end;
    providing an adhesion layer on said raised elements and channel regions, said adhesion layer comprising a thiol-binding surface;
    binding hydrophobic molecules comprising thiol moieties onto said adhesion layer;
    binding reversibly adaptive bristles comprising thiol moieties onto said distal ends, said distal ends being selectively convertible from a relatively hydrophobic state to a relatively hydrophilic state by the application of an external stimulus while said lateral surfaces remain hydrophobic.

13. The process of claim 12 in which each of said hydrophobic molecules comprises a first end bonded to one of said lateral surfaces, one of said distal ends or one of said channel regions; and in which each of said hydrophobic molecules comprises a second end unbound to any of the distal ends and an elongated region interposed between said first and second ends.

14. The process of claim 12, comprising the step of binding said reversibly adaptive bristles onto said distal ends after said step of binding said hydrophobic molecules onto said adhesion layer.

15. The process of claim 12, comprising the step of binding said reversibly adaptive bristles onto said distal ends before said step of binding said hydrophobic molecules onto said adhesion layer.

16. A process for making a reversibly adaptive rough structure, comprising the steps of:
    providing a substrate;
    providing a plurality of raised elements on said substrate, said raised elements mutually spaced apart by channel regions on said substrate, each of said raised elements having a lateral surface and a distal end;
    binding hydrophobic molecules onto said lateral surfaces, said distal ends and said channel regions; and
    binding reversibly adaptive bristles onto said distal ends, said distal ends being selectively convertible from a relatively hydrophobic state to a relatively hydrophilic state by the application of an external stimulus while said lateral surfaces remain hydrophobic.

17. The process of claim 16, in which each of said hydrophobic molecules comprises a first end bonded to one of said lateral surfaces, one of said distal ends or one of said channel regions; and each of said hydrophobic molecules comprises a second end unbound to any of the distal ends and an elongated region interposed between said first and second ends.

18. The process of claim 16, in which said reversibly adaptive bristles are bound onto said distal ends after said hydrophobic molecules are bound onto said lateral surfaces, said distal ends and said channel regions.

19. The process of claim 16, in which said reversibly adaptive bristles are bound onto said distal ends before said hydrophobic molecules are bound onto said lateral surfaces, said distal ends and said channel regions.

20. A process for making a reversibly adaptive rough structure, comprising the steps of:
providing a substrate;
providing a plurality of raised elements on said substrate, said raised elements mutually spaced apart by channel regions defining channels on said substrate, each of said raised elements having a lateral surface and a distal end;
filling said channels with sacrificial material;
binding reversibly adaptive bristles onto said distal ends, said distal ends being selectively convertible from a relatively hydrophobic state to a relatively hydrophilic state by the application of an external stimulus while the lateral surfaces remain hydrophobic;
removing said sacrificial material; and
binding hydrophobic molecules onto said lateral surfaces, said distal ends and said channel regions.

* * * * *